United States Patent [19]
Stanley et al.

[11] 3,733,887
[45] May 22, 1973

[54] METHOD AND APPARATUS FOR MEASURING THE THERMAL CONDUCTIVITY AND THERMO-ELECTRIC PROPERTIES OF SOLID MATERIALS

[75] Inventors: Marland L. Stanley, Idaho Falls, Idaho; Allen D. Reich, Des Plaines, Ill.

[73] Assignee: Borg-Warner Corporation, Chicago, Ill.

[22] Filed: Jan. 31, 1972

[21] Appl. No.: 222,265

[52] U.S. Cl. ..................................73/15 A, 324/32
[51] Int. Cl. ..................................G01n 25/18
[58] Field of Search ..............................73/15; 324/32

[56] References Cited

UNITED STATES PATENTS 2,994,818  8/1961  Harman.................................73/15

FOREIGN PATENTS OR APPLICATIONS 1,036,124  7/1966  Great Britain..........................73/15

Primary Examiner—Herbert Goldstein
Attorney—Thomas B. Hunter

[57] ABSTRACT

A method and apparatus for measuring the thermal conductivity, surface heat transfer coefficients and the thermo-electric power of materials, involving the employment of the Peltier effect to establish the temperature difference across, while simultaneously measuring the rate of heat flow through, the investigated sample material.

A predetermined current is applied to a thermoelectric couple sensor to produce a temperature difference across the thermoelectric couple sensor by controlling the temperature of the cold junction of the sensor. The thermal conducting body is engaged with the cold junction of the sensor. The current is then adjusted by a predetermined amount to re-establish the temperature differential. By measuring the change in the current required to restore the temperature differential, the thermal conductance of the body may be determined.

4 Claims, 11 Drawing Figures

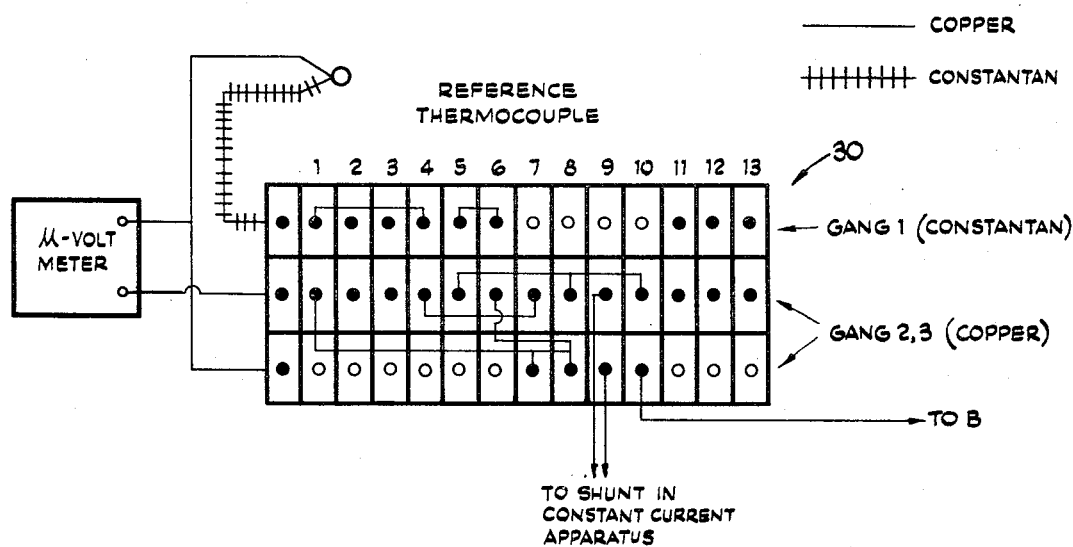

Fig 6

—— COPPER
++++++ CONSTANTAN

REFERENCE THERMOCOUPLE

GANG 1 (CONSTANTAN)
GANG 2,3 (COPPER)

μ-VOLT METER

TO B

TO SHUNT IN CONSTANT CURRENT APPARATUS

| POSITION | FUNCTION | |
|---|---|---|
| 1 | ABSOLUTE TEMP | $T_1$ |
| 2 | " " | $T_2$ |
| 3 | " " | $T_3$ |
| 4 | " " | $T_4$ |
| 5 | " " | $T_5$ (A) |
| 6 | " " | $T_6$ (B) |
| 7 | DIFFERENTIAL TEMP. | $T_1 - T_4 = \Delta T_C$ |
| 8 | " " | $T_5 - T_6 = \Delta T_S$ |
| 9 | SENSOR COUPLE CURRENT | $I_0, \Delta I$ |
| 10 | SEEBECK VOLTAGE, | $V_{5-6}$ |
| 11 | ABSOLUTE TEMP. | $T_7$ |
| 12 | " " | $T_0$ |
| 13 | " " | $T_8$ |

COPPER CONSTANTAN THERMOCOUPLES ARE CONNECTED TO POLES OF GANG 1 AND 2 TO SAMPLE FIXTURE POSITIONS SHOWN IN FIG.1

METHOD AND APPARATUS FOR MEASURING THE THERMAL CONDUCTIVITY AND THERMO-ELECTRIC PROPERTIES OF SOLID MATERIALS

This invention relates to a method and apparatus for measuring the thermal conductivity and thermo-electric properties of solid materials.

BACKGROUND OF THE INVENTION

Absolute, steady-state methods of measuring thermal conductivity have become well established and accuracies better than 5 percent have been attained (Ratcliffe, Brit. J. Appl. Phys. 10, 22 (1959); Devyamkova et al, Soviet Physics — Solic State, Vol. 2, p. 68). Most methods use an electrical heater in one form or another to introduce a known rate of heat flow at a sample surface. A vacuum or insulating environment is usually employed to eliminate convection losses and at higher temperatures a radiation shield is usually employed. Evaluation and maintenance of instrument performance requires a stable universal standard or control sample, and Devyamkove has demonstrated the generally useful properties of fused quartz for this purpose.

Although the attainable accuracy of existing techniques, as attested by the general agreement of the fused quartz data, is sufficient for many material characterization requirements, there is something left to be desired. It would be advantageous if the thermal conductivity measurements could be made with the ease and speed of electrical conductivity determinations. Powell has reported, in J. Sci. Instr. 34, 485 (1957), a comparator method which is simple and fast and he obtained 6% measurements on alloys of aluminum, magnesium and iron. His approach has possible limitations with regard to surface properties and the hardness of samples. Nevertheless, it suggests that simple techniques can approach the more time-consuming standard methods.

The present method follows Powell's approach to the extent that measurement simplicity and speed are given high priority. But a different technique is adopted in order to achieve absolute measurements on different classes of materials. To this end, the Peltier effect of a simple thermo-electric couple is used to produce the temperature difference and to measure the heat flux. The application of the Peltier effect has already been utilized by Harman, J. Appl. Phys. 30, 9 (1959), but his approach is restricted to samples with non-trivial thermo-electric properties and long equilibrium times are usually required. A thermo-electric, heat sensor has also been reported by Shulte and Kohl in Rev. Sci. Instrum. 40, 11 (1969), which measures the heat flowing across a surface, permitting measurements of "external" samples. The heat transfer sensor of the present invention is similar, except that the device capability of high quality thermo-electric material is exploited in the measurement.

SUMMARY OF THE INVENTION

Since determination of the thermal conductivity, $K_s$, of a material requires the measurement of the rate of heat flow, $Q_s$, through the material when a known temperature difference, $\Delta T_s$, is applied, the more difficult part of this measurement is to determine $Q_s$, which must be separated from various heat flow losses. This invention relates to apparatus which utilized the Peltier effect to execute the various requirements of the thermal conductivity measurement. In addition, the apparatus measures the thermo-electric power, S, of a material by recording the open circuit voltage, $\Delta V_s$, while $\Delta T_s$ exists across the sample.

Formally, the quantities to be measured are defined by $$K_s = (Q_s \lambda_s / \Delta T_s)$$

and $$S = (\Delta V_s / \Delta T_s)$$

where $\lambda_s = L_s/A_s$ length to area ratio of the sample.

The principal features of the present invention is the utilization of the Peltier effect to produce the temperature difference, $\Delta T_s$, while simultaneously measuring the rate of heat flow through the sample. The Peltier effect, which is a surface rather than volume phenomenon, provides improved transient and steady state characteristics compared to existing methods. The application of this phenomenon applies to a large class of materials including metals, semiconductors and insulators. It also applies to applications wherever rates of heat flow need to be determined and delicately controlled.

The apparatus of the present invention is effective to generate or absorb heat at a surface, giving a faster time constant in comparison with volume effect heaters, such as, a joule heater. The apparatus also has a useful range of linearity between the heat generated and the electric current flowing in the apparatus. This linearity extends to both the heating and cooling mode. The consequences of these advantages are contained in thermal conductivity data shown in the charts of FIGS. 5–9, inclusive, for fused quartz (silica) and commercial quality, thermo-electric material. These data suggest that rapid, convenient measurements can be performed at room temperature without removing radiation and convection effects.

The characterization of thermo-electric material can be performed at different levels of refinement. The instrumentation development described in the following disclosure performs this characterization by measuring the room temperature values of the thermal conductivity, $K_s$, the Seebeck coefficient, S, and the electrical conductivity, $\sigma_s$, to give a value of the figure of merit, $Z = S^2 \sigma_s / K_s$. The facility was developed with both accuracy and speed of measurement as primary objectives. These requirements led to the rejection of many techniques requiring time-consuming procedures and refinements. The measurement of K has been the limitation experienced by available technology. This limitation has been surmounted in the present apparatus by using the Peltier effect to measure the heat flow across a surface. This part of the apparatus, therefore, deserves special attention.

The Peltier method achieves a measurement accuracy better than 3 percent which is the performance range of other, available techniques. The advantage of this method arises in that the elaborate procedures and the high level of operator skill of other methods is not required to achieve the same accuracy level. For example, a vacuum system and radiation shields are not used in the apparatus.

The performance of the method is evaluated in terms of measurements made on fused quartz and commercial quality thermo-electric alloys obtained from Material Electronics Corp. (Melcor). These samples were systematically measured in an intense, standardization procedure carried out along with the routine evaluation of samples. Seasonal averages of the standardization data are shown over a five year period of the instruments use. These statistics (FIGS. 6–9) show the measurement precision achieved with the Peltier method.

Accordingly, the present invention has as a principal object to provide an improved method and apparatus for measuring the thermal conductivity and thermo-electric properties of solid materials.

Another object of the invention is to provide an improved method and apparatus for utilizing the Peltier effect to determine the thermal conductivity of a sample material involving applying a known temperature difference to the sample material while simultaneously measuring the rate of heat flow through the sample material.

Another object of the invention is to provide an improved method and apparatus for determining the properties of thermo-electric materials by the rapid and accurate speed of measurement of the room temperature values of the thermal conductivity, the Seebeck Coefficient and the electrical conductivity, to provide a figure of merit, and in which the Peltier effect is used to measure the heat flow across a surface of the materials.

Additional objects and advantages will be apparent from the following detailed description taken in conjunction with the drawings.

DESCRIPTION OF THE DRAWINGS

FIG. 6 is a diagrammatic view of electric circuitry for the heat flux switching system employed with the apparatus of FIGS. 1, 2 and 4.

DETAILED DESCRIPTION

Figure 1:
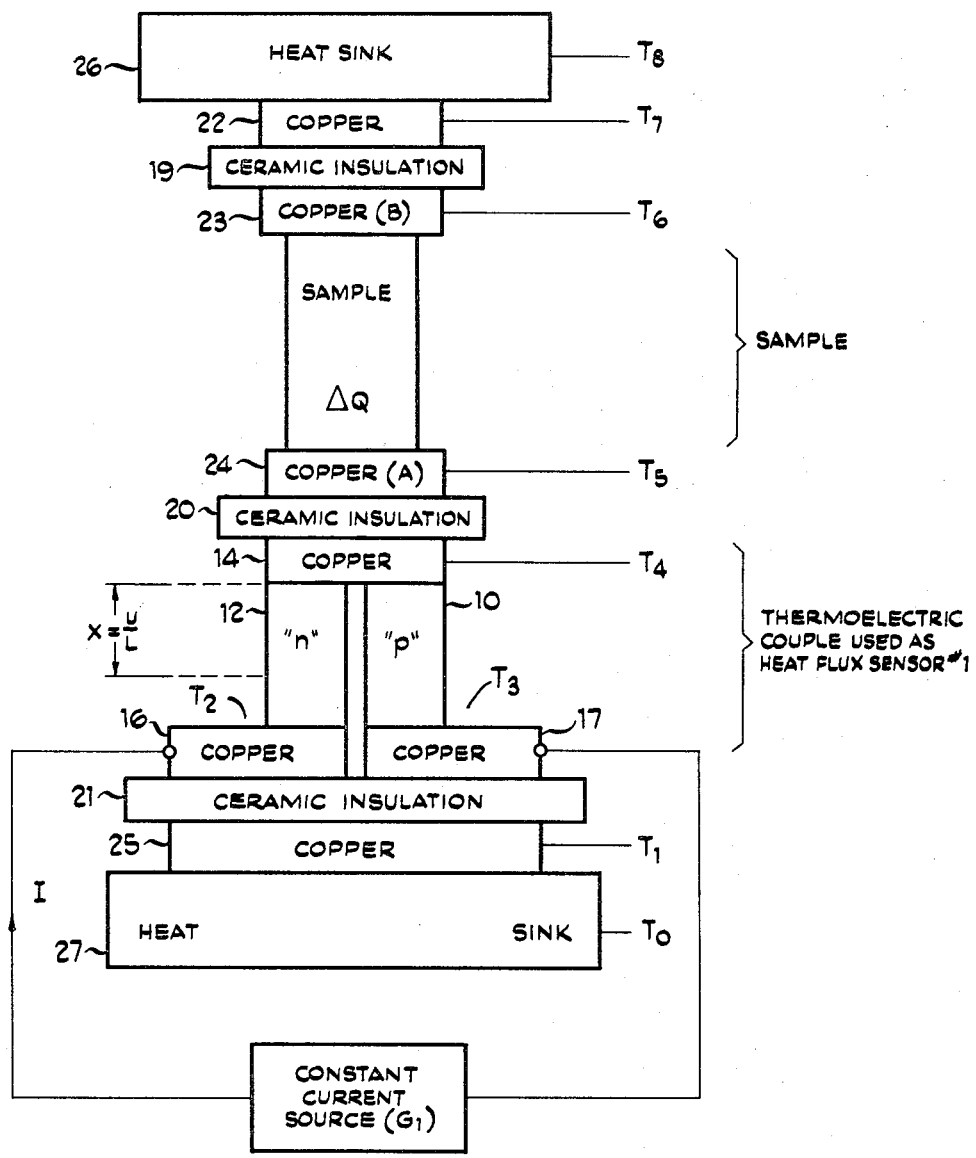
FIG. 1 is a schematic representation of apparatus constructed in accordance with the principles of the present invention and characterized by employing a single sensor configuration for measuring the thermal conductivity by utilizing the Peltier effect.

The apparatus of the present invention includes a typical prior art thermo-electric couple illustrated in FIG. 1. This couple comprises a plurality of modules including a homogeneous element 10 of p-type semiconductor material (doped with acceptor impurities) and a second homogeneous material (doped with donor impurities). The two elements 10 and 12 are coupled in series by a conductor 14, usually in the form of a copper bus bar which is soldered or otherwise electrically and physically joined to the ends of the thermo-electric elements. The application of unidirectional D.C. electrical energy through the p and n elements in series produces a cold junction at the connection of the conductor 14 with one end of each of the elements 10 and 12 and a hot junction at the soldered connection of the opposite ends of the elements to the copper bar conductors 16 and 17. The supply of electric energy is shown schematically and is in the form of a constant current source $G_1$. The thermo-electric couple is identified in its capacity as a heat flux sensor in FIG. 1.

The thermo-electric couple is employed to utilize the Peltier effect in the several methods and apparatus of the present invention for measuring the thermo-electric properties of materials, as will now be described.

MEASUREMENT TECHNIQUES

Single Sensor, Double Balance Method

The basic scheme for utilizing the Peltier effect is shown in FIG. 1. The assembly is formed by connecting the Peltier sensor and the sample in series with the heat sinks 26 and 27. Various temperatures are designated $T_1$, $T_2$, $T_3$, $T_4$, $T_5$, $T_6$ and $T_7$. The heat sinks are maintained such that $T_1 \approx T_7$, and both temperatures are held constant. The ceramic insulators 19, 20 and 21 isolate the copper parts 22 and 23; 24 and 14; and 16, 17 and 25 of the system electrically and provide good thermal conduction such that $T_6 \approx T_7$, $T_4 \approx T_5$ and $T_1 \approx T_2 \approx T_3$. Heat sinks 26 and 27 respectively engage the copper parts 22 and 25. A highly stable, manually-adjusted current source, $G_1$, provides the control for the sensor. The assembly is preferably mounted on a precision sliding mechanism located in a box permitting samples to be conveniently introduced and removed from the fixture.

By introducing two balances, the heat losses associated with the sensor are removed. The first balance is made in the absence of the sample by introducing a control current, $I_o$, which lowers the cold junction temperatures ($T_4$ and $T_5$) below $T_1$ by several degrees. The sample is then introduced and this raises $T_4$ and $T_5$. The second balance restores $T_4$ and $T_5$ to their original values by increasing the control current to $I_o + \Delta I$. The $\Delta I$ measures the increment of heat flow out of the sample and, by also measuring $T_5$, $T_6$ and the sample geometry, the thermal conductivity can be determined.

The quantitative determination of the heat flow can be determined from the energy balance of a thermo-electric couple which apply to the sensor. The first equilibrium equation is of the form $$Q_c = 2S_c I_o T_4 - I_o^2 P_c \lambda_c - (2K_c \Delta T_c/\lambda_c) \qquad (1)$$

where $S_c$, $P_c$ and $\lambda_c$ are the Seebeck coefficient, electrical resistivity and thermal conductivity of the sensor. The properties of the "n" and "p" arms are assumed to be identical, except for the sign of $S_c$. $\lambda_c$ is the length to ratio of either sensor arm and $\Delta T_c$ is given by $$\Delta T_c = (T_2 + T_3/2) - T_4.$$

$Q_c$ represents a background heat flow contributed by radiation and convection over the cold junction surface. After the sample is introduced and the new balance is achieved, the equation becomes $$Q_c + [K_s(T_6-T_5)/\lambda_s] = 2S_c(I_o + \Delta I) T_4 - (I_o + \Delta I)^2 P_c \lambda_c - (2K_c\Delta T_c/\lambda_c) \quad (2)$$

In this equation, $K_s$ and $\lambda_s$ are the thermal conductivity and length to area ratio respectively of the sample.

Combining Eq. (1) and Eq. (2) leads to a value for $Q_s$ and $\lambda_s$ given by $$Q_s = [K_s(T_6-T_5)/\lambda_5] - \Delta I[2S_cT_4 - (2I_o + \Delta I) P_c \lambda_c] \quad (3)$$

and $$K_s = [\lambda_s \Delta I/(T_6 - T_5)] [2 S_c T_4 - (2 I_o + \Delta I) P_c \lambda_c] \quad (4)$$

Since $K_c$, which is the most uncertain of the sensor parameters, does not appear in the final result, $2 S_c$ and $P_c\lambda_c$ remain as calibration constants which can be measured independently to about 1 percent. $Q_c$ has also been eliminated, and this rests upon the assumption that radiation and convention effects on the arms and the cold junction are stable during the course of the measurement. For those applications where only the heat flux across B is needed, Eq. 3 can be used instead of Eq. 4.

Double Sensor Method

Figure 2:
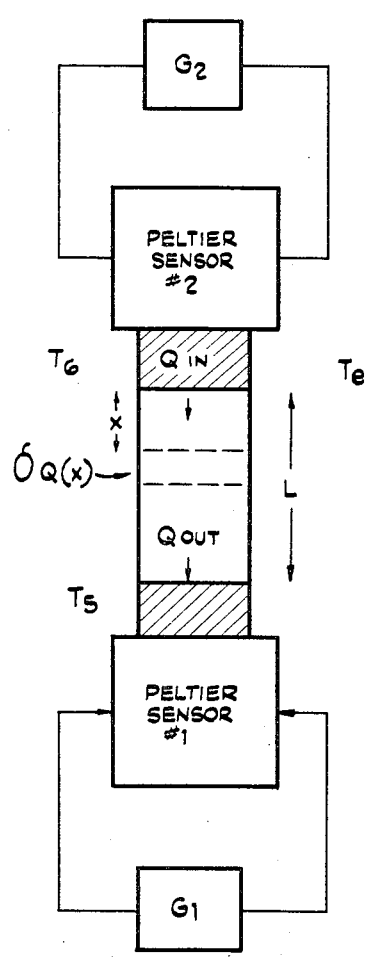
FIG. 2 is a schematic representation of a modification of the apparatus shown in FIG. 1 including a second Peltier sensor.
Figure 3:
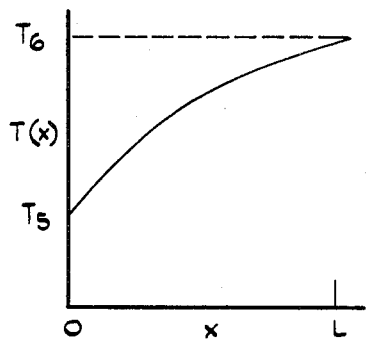
FIG. 3 is a graph showing the temperatures and dimensions assumed for the sample shown in FIG. 2.

In order to deal with the remaining error associated with sample surface losses in the Single Sensor, Double Balance Method, a second Peltier sensor (No. 2), similar to sensor No. 1, and having a current source $G_2$ can be added as shown in FIG. 2 to obtain the graphic results of FIG. 3 This configuration permits the heat flow to be measured at both ends of the sample, and this added information permits a correction to be made for the surface losses.

To simplify the treatment of the correction, it is assumed that the radiation term can be linearized and that the temperature varies only in the $x$-direction. Under these conditions, the differential equation and boundary conditions for the temperature distribution are given by $$K_sA_s(d^2T^{(x)}/dx^2) + h_cS_A[T_e - T(x)] + B_1T_e^3 [T_e - T(x)] = 0 \quad (5)$$

$$T(o) = T_5 \quad (6)$$

$$T(L) = T_6 \quad (7)$$

$$Q_0 = Q_{IN} = -K_sA_s\frac{dT}{dx}\bigg|x=0 \quad (8)$$

$$Q_L = Q_{ouT} = -K_sA_s\frac{dT}{dx}\bigg|x=L \quad (9)$$

The environment temperature, $T_e$, is assumed to be constant, and to satisfy the linearization of the radiation term, must be near the mean sample temperature. $h_c$ and $B_1$ are coefficients associated with surface convection and radiation. $A_s$, $S_A$ and $L_s$ are the sample cross-section area, surface area, and length, respectively. The solution for $T(x)$ which satisfied Equation 6 and Equation 7 has the form $$T(x) = T_e - \frac{1}{\sinh \sqrt{B_2}} \left\{ (T_e - T_5) \sinh \left[ \sqrt{B_2}\left(1 - \frac{x}{L}\right) \right] + (T_e - T_6) \cosh \left[ \sqrt{B_2}\left(\frac{x}{L}\right) \right] \right\} \quad (10)$$

where $B_2$ is given by $$B_2 = (h_cS_AL_s^2/K_sA_s) + B_1T_e^3 (L_s^2/K_sA_s) \quad (11)$$

When the last two boundary conditions are added, $B_2$ can be eliminated from the equation and $K_s$ can be determined as $$K_s = [Q_{in} \lambda_s/(T_e - T_5)] (\tanh \sqrt{B_2}/ \sqrt{B_2}) \quad (12)$$

where $B_2$ is determined from $$(T_e - T_5) \cosh \sqrt{B_2} + (T_e - T_6) (Q_{in}/Q_{out}) \sinh \sqrt{B_2} = (Q_{in}/Q_{out}) (T_e - T_5). \quad (13)$$

The surface heat losses of the body are corrected by utilizing a thermoelectric body having a uniform cross-section. A predetermined current ($I_{c1}$) is applied to a second thermoelectric couple sensor ($C_1$) while a predetermined current ($I_c$) is applied to the first sensor (C). The cold junction temperature ($T_5$) of the second sensor is thereby elevated above the ambient temperature as the cold junction ($T_4$) of the first sensor is lowered below the ambient temperature.

One end of the body is contacted with the cold junction of the second sensor while the other end is engaged with the cold junction of the first sensor (C). The currents ($I_c$ and $T_{c1}$) are adjusted to restore the previously established cold junction temperatures ($T_4$ and $T_5$). The changes in current ($I$ and $I_1$) are measured to establish the thermal conductance in and out of the body, i.e. $Q_{in}$ and $Q_{out}$. The ambient temperature ($T_e$) and the cold junction temperatures ($T_4$ and $T_5$) are then measured. With the known length ($L_s$) and cross-sectional area ($A_s$) the ratio $\lambda_s = L_s/A_s$ is then determined. With the foregoing measured and determined quantities, the predetermined electrical resistivity ($\rho_c$ and $\rho_{c1}$), Seebeck coefficients ($S_c$ and $S_{c1}$), and length to area ratios of sensors C and $C_1$, the thermal conductivity of the body may be determined by the formula $$K_s = (Q_{in}\lambda_s/T_e - T_4) \quad \tan \sqrt{B}/ \sqrt{B}$$

where $$(T_e - T_4) \cos h \sqrt{B} + (T_e - T_5) (Q_{in}/Q_{out}) \sin h \sqrt{B} = (Q_{in}/Q_{out}) \quad (T_e - T_4)$$

Although this method permits a correction to be made for losses, the price comes high. Two Peltier sensors must now be operated in accordance with the described techniques to determine $Q_{IN}$ and $Q_{ouT}$. These results must then be used in the inconvenient expressions given by Eq. 12 and Eq. 13.

Figure 4:
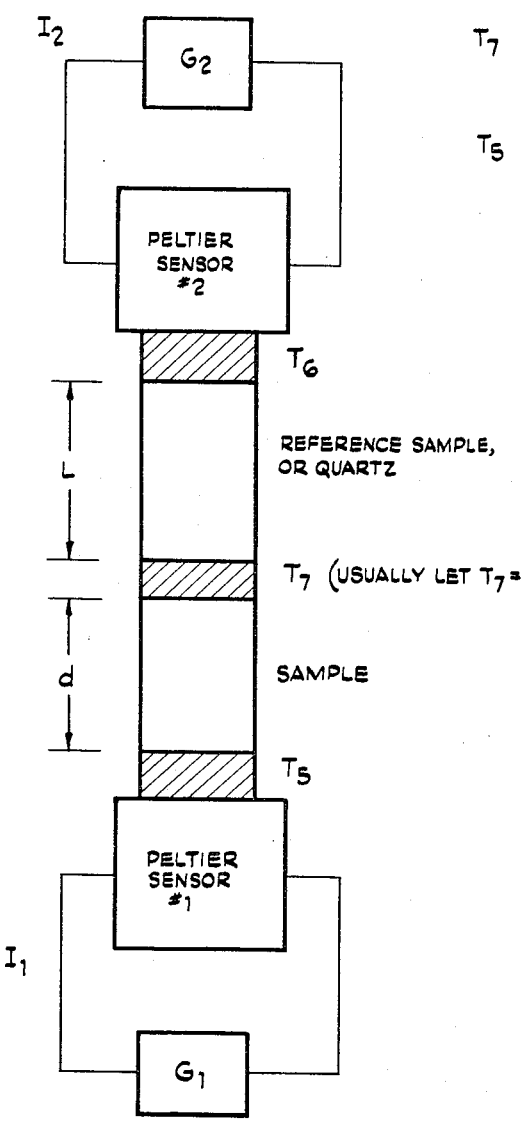
FIG. 4 is a schematic representation of another modification of the apparatus shown in FIG. 2 and in which the two Peltier sensor configuration is employed as a thermal comparator.

The situation can be significantly simplified by using the two-sensor configuration as a thermal comparator. As shown in FIG. 4, one sensor is operated in the heating mode and the second in the cooling mode, and no heat flux determinations are required. Instead, heat flow is introduced through the sample in series with a suitable reference, the temperature differentials are recorded, and is calculated using $$K_s = K_r (\lambda_s/\lambda_r) (T_6-T_7/T_7-T_5) = (K_r \lambda_s \Delta T_r / \lambda_r \Delta T_s)$$

(14)

The subscript $r$ denotes the corresponding parameters of the reference or standard material.

Figure 5:
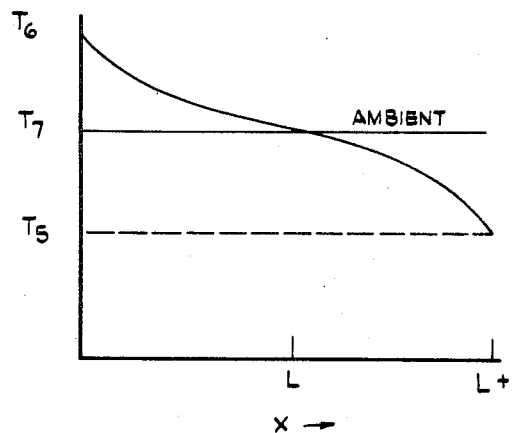
FIG. 5 is a graph illustrating the temperature and dimensions assumed for the sample shown in FIG. 4.

The use of the second sensor (sensor No. 2) in the heating mode permits the differentials to be established with $T_7 \approx T_6$, and this condition tends to balance out the surface losses. Ideal conditions would involve identical geometry, surface properties, and thermal conductivity of reference and sample. For this condition, the temperature distribution shown in FIG. 5, though non-linear, would be symmetric and $T_6 - T_7 = T_7 - T_5$ would prevail, giving the correct determination in Eq. 14. In practical cases, the sample and standard will differ in one or more respects, and only an approximation to the ideal condition can be obtained.

A reference body of uniform cross-section and known thermal conductivity ($K_r$) is provided in series with the sample between the two Peltier sensors. The reference body and sample being disposed between the sensor (C) and a second thermoelectric couple sensor ($C_1$) so that the reference body engages the cold junction of the second sensor ($C_1$) and the sample engages the cold junction of sensor (C). The current is then adjusted to provide a temperature between the sample and the reference body which is substantially equal to the ambient temperature ($T_e$). The ambient temperature ($T_e$) and temperatures ($T_4$ and $T_5$) of the cold junctions are then determined. With the foregoing measured and known quantities, the thermal conductivity of the sample may be determined by the formula $$K_s = K_r (T_5 - T_4/Te - T_4)$$

Adding a second sensor, then, provides two avenues of attack upon the surface loss problem. The absolute method provides a broadly applicable technique, but the loss corrections involve extensive measurements and calculations. The comparator method balances out the surface losses by means of a simple, direct measurement, but is restricted by the requirement of a standard with properties closely matching those of the sample.

INSTRUMENTATION

Sensor Material

The material for the sensors was obtained from Material Electronics Corp. (Melcor), and the measurements on a typical pair of samples is shown in Table I.

$$K_c(T) = (300) [1. - 0.00114 (T - 300)]$$
$$10_c(T) = \rho_c(T) = (300) [1. + 0.00469 (T - 300)]$$
$$S_c(T) = (300) [1. + 0.00210 (T - 300)]$$

Since the material parameters of the sensor critically influence measurement accuracy, an elaborate calibration procedure for each fabricated sensor is justified.

The choice of sensor couple geometry depends upon the thermal conductivity, $K_s$, of the samples to be measured. For purposes of illustration, the measurement of thermo-electric material will be considered, which requires a range of $K_s$ from about 5 to 25 milliwatts/deg C cm. A length to area ratio, $\lambda_c \approx 2.\text{cm.}^{-1}$ will be adopted as a nominal geometry factor. A $\Delta T_S$ in the 3° to 4° C range will be used across the sample, resulting in a total sample conductance in the 10 to 50 milli-watt range. This range of heat flux and surface area lead to a particular class of convection and convection lossess. The invention applies to other flux, conductance and geometric configurations, although radical departures from this example may require different techniques for minimizing the losses. In the present case, a sensor length of 0.3 inch was adopted with 0.32 inch half cylinders giving a $\lambda_c$ of 2.4 cm$^{-1}$. This choice represents a compromise reached by experience between physical strength, sensitivity requirements, and surface heat loss effects.

Apparatus

The copper-ceramic-copper interfaces shown in FIG. 1 were assembled using metallized aluminum-oxide plates 0.10 inch thick. Copper discs were soldered to the metallized surfaces using lead-tin solder. These assemblies gave electrical resistances across the insulator in the $10^6$–$10^8$ ohm-cm range and thermal conductance of about 3 watts/cm$^2$deg C. The electrical isolation prevented ground loops and other interference effects in the $\mu$-volt level signals. The high thermal conductance gave temperature drops which were in the 0.01°–0.03° C range. HOwever, the temperatures on both sides of the insulator were frequently monitored to correct for this error.

The assembled sensor-couple was mounted on a large copper block such that a 100 mwatt load resulted in a temperature rise of less than 0.1° C/hour. A second heat sink was located on a Gilman slide assembly for contacting the other end of the sample. Surface losses were partially stabilized by desiccating the sample enclosure and by silvering the inner enclosure surfaces. During the evolution of the apparatus, experiments were carried out to reduce the convection and radiation losses. Since accurate measurements result when the losses are simply stabilized, the further refinements which reduce or even eliminate the losses were found to be unnecessary.

The switching circuitry for measuring the required signals is shown in FIG. 6. The heart of this system is a three gang switch 30 with at least 10 positions. FIG. 6, of course, represents the switching circuit schematically. The stationary contact points are shown at the

TABLE 1.—TEMPERATURE DEPENDENCE OF MELCOR MATERIAL

|  | N-type, 300° | 290° | Percent/ °C. | 300 °C. | P-type, 290° | Percent/ °C. |
|---|---|---|---|---|---|---|
| $K_c$(mw./° C. cm.) | 16.2752 | 16.4544 | 0.0110 | 13.897 | 14.061 | 0.00118 |
| $O_c$(m. ohm cm.)$^{-1}$ | 943.01 | 904.72 | 0.00423 | 1035.86 | 985.16 | 0.00515 |
| $S_c$(u-volt/° C.) | 198.0 | 194.2 | 0.00196 | 196.0 | 191.7 | 0.00224 |

Linearized Temperature Dependence of Averaged Sensor Parameters left-hand end of the switching matrix, the upper one being connected to the constantan lead of a reference thermocouple. The stationary contact on gang 2 below is connected to one terminal of a $\mu$-volt meter. The third stationary contact on gang 3 is connected to the copper lead from the reference thermocouple and also to the opposite terminal of the $\mu$-volt meter. The switch may be presumed to have wiping arms ganged together, each having its anchor point or stationary contact respectively electrically connected to the three contact points illustrated to the left end of the switching matrix. The movable ends are adapted to selectively contact positions 1 through 13. For example, position 1 is used to measure the absolute temperature $T_1$ (referring to FIG. 1). A thermocouple would be secured to the copper plate 25 located between the heatsink 27 and insulation 21, said thermocouple having its constantan lead attached to contact 1 in gang 1 and its copper lead secured to contact 1 in gang 2. Contact 1 in gang 3 is open.

The wiper, contacts, and connecting wires of gang 1 are constructed of constantan metal, and the other gangs are made of copper. ⅜ inch diameter cross sections and multi-edged wipers under heavy pressure were used to reduce thermal emf's. The reference thermocouple was maintained in an ice bath, and the $\mu$-volt meter in switch positions 1–6, and 11, 12 measure the thermocouple voltages from each position against this reference through gangs 1 and 2. $\Delta T_c$ and $\Delta T_S$ are measured by shorting the constantan leads from gangs 2 and 3. The sensor couple current is read on the $\mu$-volt meter from the voltage drop across a 50 milliohm shunt in series with the power supply, G-1 in FIG. 1. G-1 must provide a stable adjustable DC current in the 0–2 amp range at a 0–100 millivolt level. This component can be obtained commercially. The Seebeck voltage, $V_{5-6}$, is read from the copper lead of the thermocouple to A and the additional copper lead from position 10, gang 3 to B. With this circuit, all of the information is fed to a single $\mu$-volt meter, which can be a K-3 potentiometer or an electronic instrument such as the Medistor, Model A-71cr $\mu$-volt potentiometric voltmeter.

An example of the data and the use of the data to calculate $K_s$ with Eq. 4 is summarized in Table II.

TABLE II

TYPICAL SET OF SAMPLE DATA

Data

| Physical Quantity | Equilibrium with no Sample | Equilibrium with Sample |
|---|---|---|
| $T_1$* | 885.4 | 886.2 |
| $T_4$ | 732 | 731.6 |
| $T_5$ | 733 | 733 |
| $T_6$ | 893.6 | 893.2 |
| $T_{11}$ | 883.9 | 887.2 |
| I(amp) | 0.7795 | 1.0680 |

* Temperatures are recorded in terms of thermocouple $\mu$volt readings using No. 40 Copper Constantan Thermocouples.

Reduced Data
Sample geometry (L = 0.3384, D = 0.3227), $\lambda_S$ = 1.6290
Change in current, $\Delta T$ = 0.2885
Temperature differential across sample $\Delta T$ = 3.9800°
Calibrated Seebeck voltage, $2S_c$ = 391.63
Cold junction temperature, $T_4 = T_c$ = 295.63° K
Initial current, $I_o$ = 0.7795 amps
Calibrated couple resistance = 3.59 m$\Omega$
From Equation 4

$$K_s = [(1.6290)(0.2885)/(3.980)](0.39163)$$
$$(295.63) - [2(0.7795) + 0.2885](3.59/2) \times 10^{-3}$$

$$K_s = 13.65 \text{ mw units.}$$

The calibration values for the sensor used in this determination are $2S_c$ = 391.63 $\mu$-volt and $\rho_c \lambda_c$ = 3.95 milliohm. The reduction to practice required a series of different sensors to be used with slightly different calibration values.

The measurement of S was made from $$S = (V_{6-7}/T_6 - T_5)$$

Resistivity values can also be measured using a 4-point probe method with commercially available milliohm meters. A Kiethley 503 milliohmmeter was used to obtain the data shown in the next section. The S and $\sigma_s$ measurements are routine and conventional measurements. They are mentioned here to permit the measurement of the figure of merit, Z, given by $$Z = (S^2 \sigma_s/K_s)$$

(15)

The following results illustrate the ability of the Peltier method to measure $K_s$. But with very little additional effort, the S and $\sigma_s$ data can be added to convert $K_s$ into an accurate measurement of Z.

EXPERIMENTS IN THE PERFORMANCE OF DESCRIBED METHODS

(a) Fused Quartz

A measurement facility was developed and used for production measurements. Since fused quartz has a thermal conductivity in the same range as thermoelectrical material, it was used to monitor the system accuracy. This standard was always measured before a sample run was started and, in some cases, was repeatedly measured until a stable and "reasonable" standard value was obtained. This provided a significant accumulation of data, which relates different fixtures, electronic components, physical locations and operator skill. The heavy standardization implied by this data was feasible because the measurement time is less than 15 minutes per sample. The data permits an empirical estimate of the integral effects of several error sources for both short and long term operation.

Figure 7:
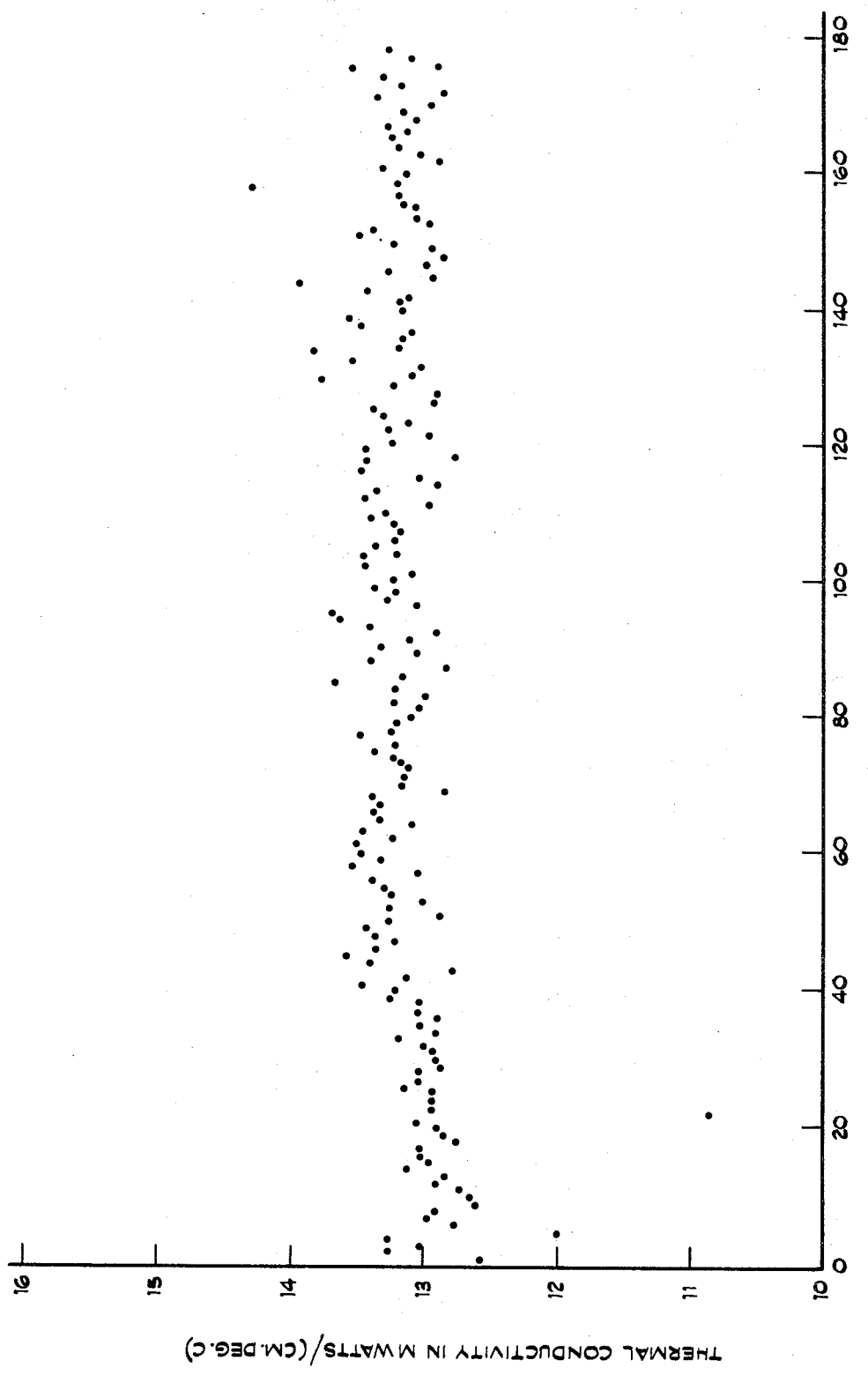
FIG. 7 is a graph showing a chronological listing of quartz measurements using the Peltier method.

FIG. 7 portrays the fused quartz data taken during the production use of the system from April 1 to July 1 of the first experimental year. These data have an average $K_s$, K, given by 13.02 units (milliwatts/deg C cm) and a standard deviation (S.D.) of 0.337 units. This corresponds to a repeatability level of 2.6 percent for the 15-month period of routine operation of the instrument.

(b) Thermoelectric Material

Figure 8:
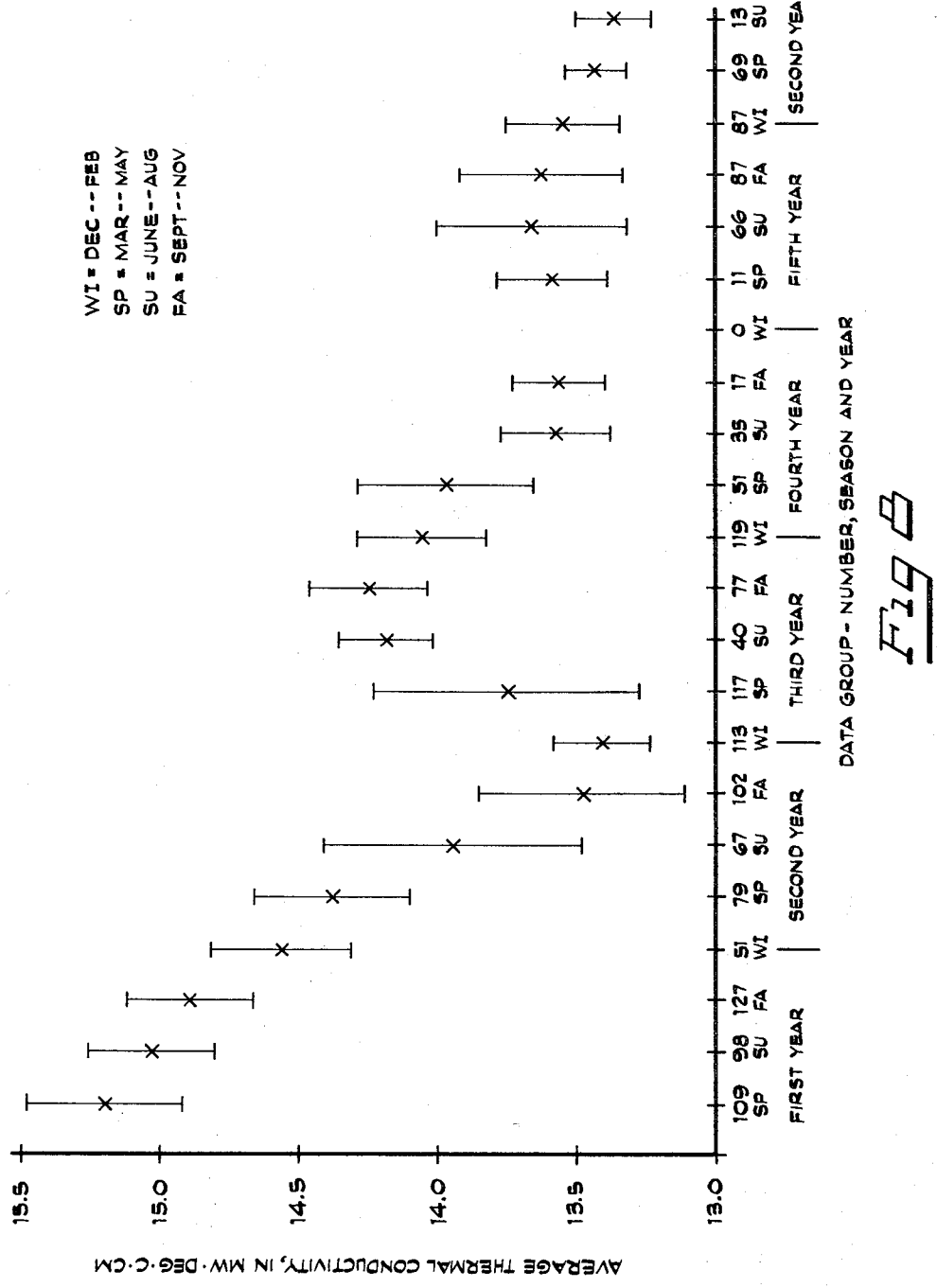
FIGS. 8–11 are graphs showing the measurements of thermo-electric properties for fall, winter, spring and summer seasons over a five year period, FIG. 8 providing data relative to the measurement of thermal conductivity, FIG. 9 providing data concerning the Seebeck Coefficient, FIG. 10 providing data about the method electrical conductivity, and FIG. 11 providing data relating to the figure of merit.
Figure 9:
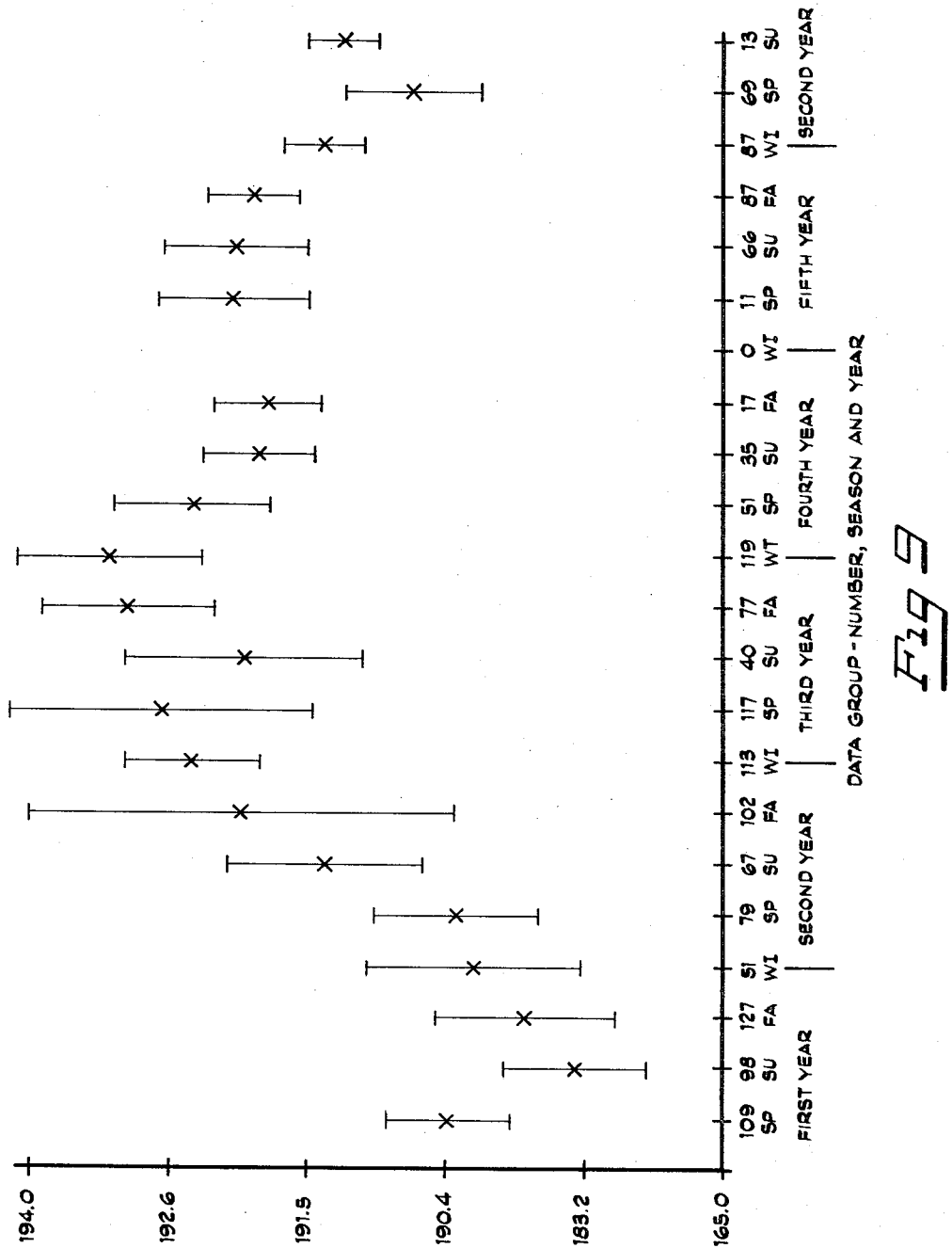
Figure 10:
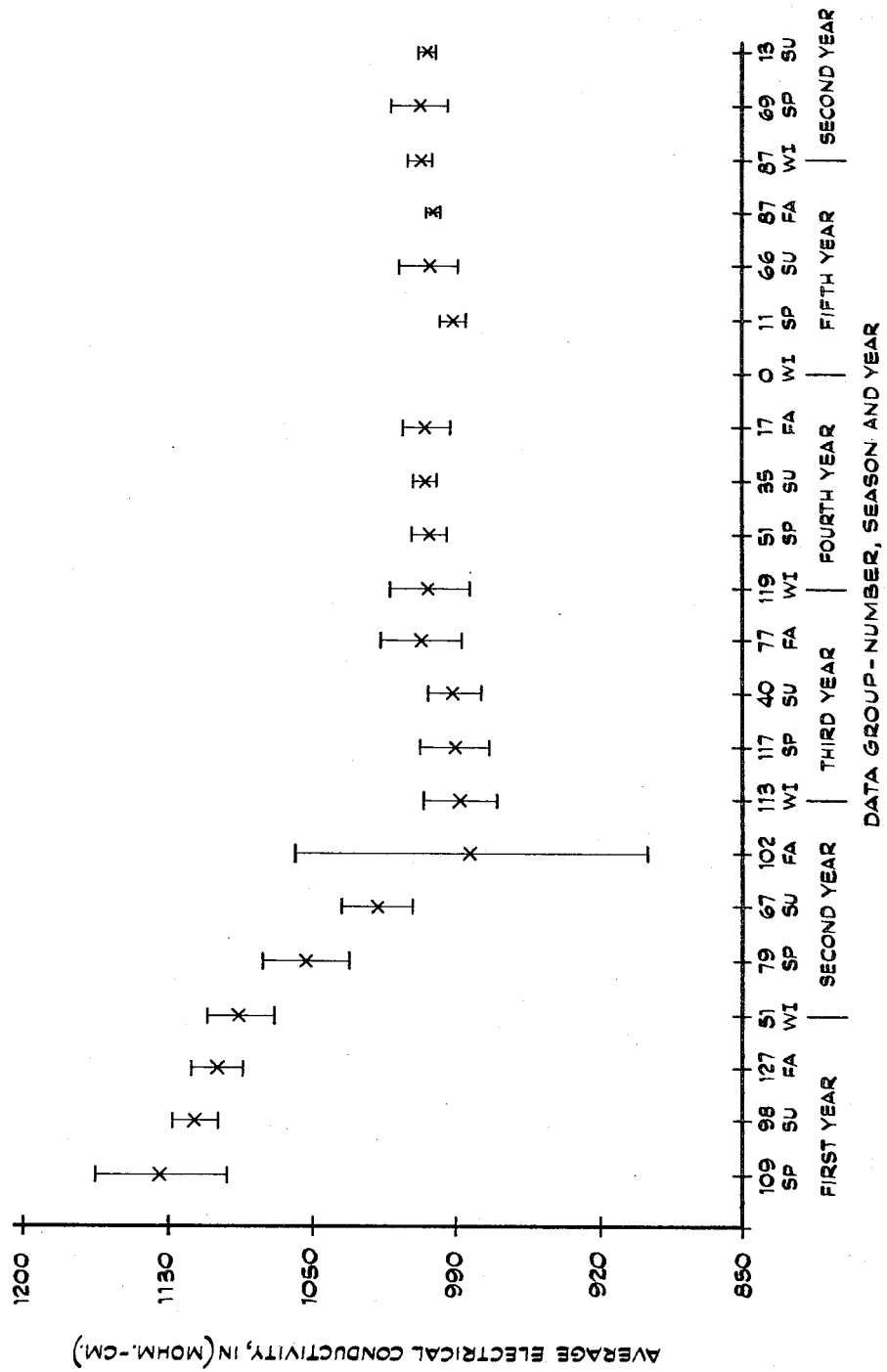
Figure 11:
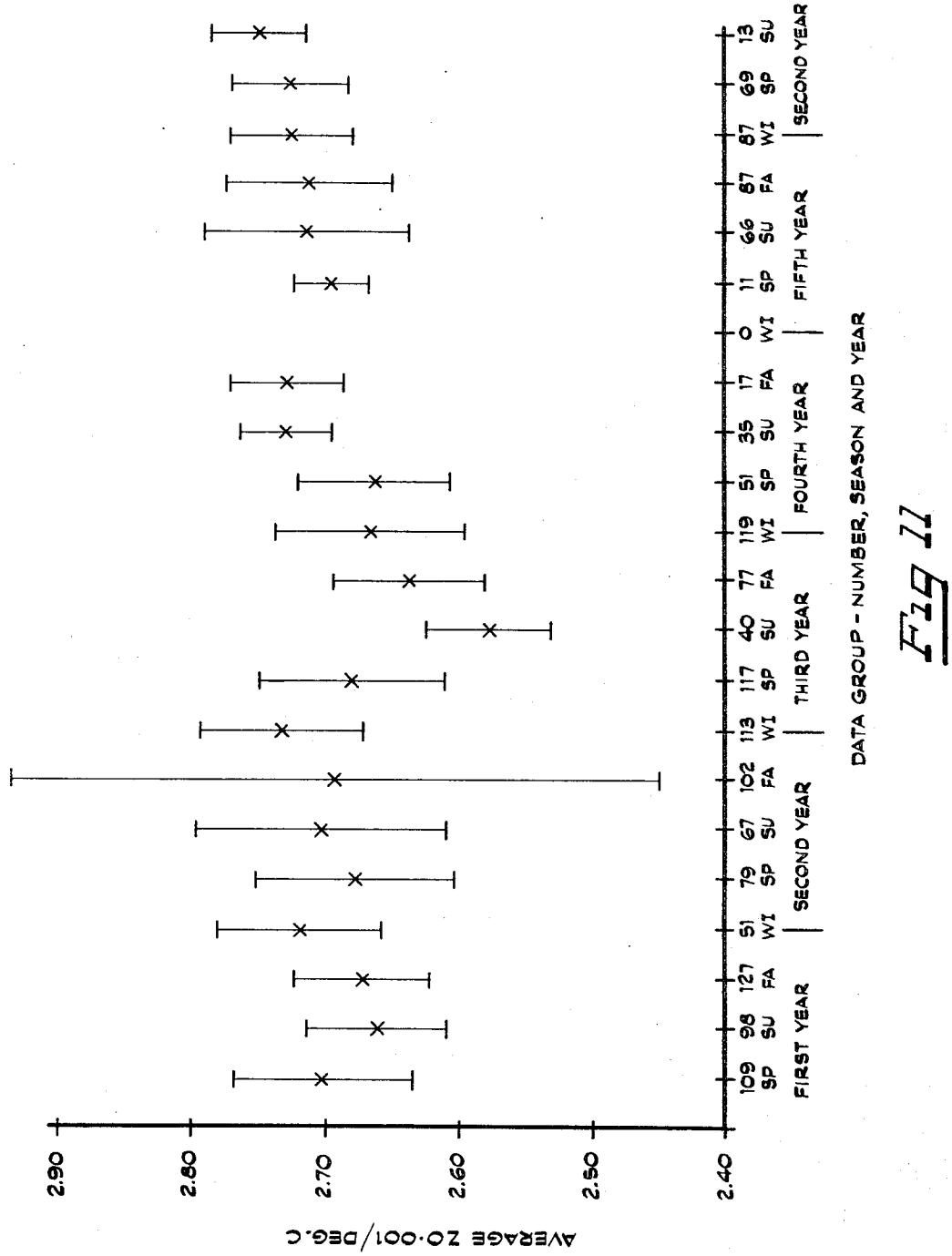

In addition to fused quartz, a commercial grade sample of p-type thermoelectric material supplied by the Melcor Corporation was used to further standardize and monitor the facility. This sample was also measured with each day's run of samples. The measurements of S, $\sigma_s$, and $K_s$ averages and S.D.'s are shown for fall, winter, spring and summer seasons over a five year period in FIGS. 8–11; FIG. 8 providing thermal conductivity data; FIG. 9 providing Seebeck coefficient data; FIG. 10 shows electrical conductivity data. This statistical summary permits the use of the Peltier method of measuring $K_s$ to be converted into a measurement of Z using Eq. (15). Summary of $\overline{Z}$ is shown in FIG. 11. Except for 102 measurements taken in the Fall of reference year 2, the figure of merit of the standard appears to have a $\overline{Z} = 2.7 \times 10^{-3}$ deg $C^{-1}$, with a repeatability over a period of years within 3 percent.

The foregoing results illustrate one example of the Peltier method of measuring $K_s$, and if desired, Z. The quality of any measurement really needs to also reflect the level of operator skill and the time required for each measurement. The measurements summarized in FIGS. 7–11 were made in less than 15 minutes each with non-professional personnel. Measurements were carried out in air, without radiation or convention shields. The seasonal statistics over a period of years demonstrate accuracy levels in the 2 to 3 percent range for the room temperature measurements of $_s$ and the figure of merit. Although this facility was used to measure fused quartz and thermoelectric material, the extension of the method can readily be made to include a large class of insulators, semiconductors and metals. In fact, the method can be used as a sensor to measure the heat flux across any surface.

What is claimed is:

1. The method of determining the thermal conductance properties of a body comprising the steps of:
    applying a predetermined current ($I_c$) to a thermo-electric couple sensor (c) to produce a temperature difference ($\Delta T_c$) across the thermo-electric couple sensor by controlling the temperature of the cold junction, $T_4$, of the sensor,
    engaging the thermally-conducting body, having a predetermined temperature, with the cold junction of the sensor,
    adjusting the current ($I_0$) by an amount $\Delta I$ to re-establish the temperature differential ($\Delta T_c$), and
    measuring the change in current ($\Delta I$) which provides the thermal conductance of the body.

2. The method as defined in claim 1 including determining the thermal conductivity, $K_s$, of the body, the body having a uniform cross-section, involving the further steps of:
    contacting one end of the body to a fixed temperature heat sink and while its other end is engaged with the cold junction of the sensor,
    determining the cold junction temperature, $T_4$, of the sensor,
    measuring the body to obtain the length ($L_s$) and cross-sectional area ($A_s$) and determining the ratio $\lambda_s = L_s/A_s$, and
    calculating, from the herein-identified measured and determined quantities and the predetermined electric resistivity ($\rho_c$), Seebeck coefficient ($S_c$), and length to area ratio ($L_c/A_c = \lambda_c$) of the sensor, the thermal conductivity of the body by the formula:

$$K_s = (\lambda_s \Delta I / \Delta T_s)[2S_c T_4 - (2I + \Delta I)\rho_c \lambda_c]$$

3. The method as defined in claim 1 including determining the thermal conductivity, $K_s$, of the body and correcting for surface heat losses of the body, the body having a uniform cross-section and including the further steps of:
    applying a predetermined current ($I_{c1}$) to a second thermo-electric couple sensor ($C_1$) while the predetermined current ($I_c$) is applied to the first-named sensor (C) such that the cold junction temperature ($T_5$) of the second sensor is elevated above the ambient temperature as the cold junction ($T_4$) of the first-named sensor is lowered below the ambient temperature,
    contacting one end of the body to the cold junction of the second sensor while its other end is engaged with the cold junction of the first-named sensor (C),
    adjusting the currents ($I_c$ and $I_{c1}$) to restore the previously-established cold junction temperatures ($T_4$ and $T_5$),
    measuring the changes in current ($\Delta I$ and $\Delta I_1$) to establish the thermal conductance in and out of the body ($Q_{in}$ and $Q_{out}$),
    measuring the ambient temperature ($T_e$) and the cold junction temperatures ($T_4$ and $T_5$),
    measuring the body to obtain the length ($L_s$) and cross-sectional area ($A_s$) and determining the ratio, $\lambda_s = L_s/A_s$, calculating $Q_{in}$ and $Q_{out}$, from the herein-identified measured and determined quantities and the predetermined electrical resistivity ($\rho_c$ and $\rho_{c1}$) Seebeck coefficient ($S_c$ and $S_{c1}$), and length to area ratios of sensor C ($L_c/A_c = \lambda_c$) and of sensor $C_1 (L_{c1}/A_{c1} = \lambda_{c1}$) by the formulas $$Q_{in} = \Delta I_1[2S_{c1}T_5 - (2I_{c1} = \Delta I_1)\rho_{c1}\lambda_{c1}]$$

$$Q_{out} = \Delta I[2S_c T_4 - (2I_c + \Delta I)\rho_c \lambda_c], \text{ and}$$

determining the thermal conductivity of the body by the formula $$K_s = (Q_{in} \lambda_s / Te - T_4)(\tan \sqrt{B}/\sqrt{B})$$

where $$(Te - T_4) \cos h \sqrt{B} + (Te - T_5)(Q_{in}/Q_{out}) \sin h \sqrt{B} = (Q_{in}/Q_{out})(Te - T_4)$$

4. The method as defined in claim 1 including determining the thermal conductivity, $K_s$, of the body and correcting for surface heat losses of the body and in which the body is a sample having a uniform cross-section, involving the further steps of:
    applying a predetermined current ($I_{c1}$) to a second thermo-electric couple sensor ($C_1$) while the predetermined current ($I_c$) is applied to the first-named sensor (C) such that the cold junction temperature ($T_5$) of the second sensor is elevated above the ambient temperature as the cold junction ($T_4$) of the first-named sensor is lowered below the ambient temperature,
    providing a reference body of uniform cross-section and known thermal conductivity, $K_r$,
    disposing the reference body and sample between the sensor (C) and a second thermo-electric couple sensor ($C_1$) with the reference body engaging the sample, the reference body engaging the cold junction of the second sensor ($C_1$), and the sample engaging the cold junction of the sensor (C),
    adjusting the currents of the sensors to provide a temperature between the sample and the reference body equal to the ambient temperature ($T_e$),
    determining the ambient temperature ($T_e$) and the temperatures ($T_4$ and $T_5$) of the cold junctions of the sensors,
    calculating, from the herein-identified measured and known quantities, the thermal conductivity of the sample by the formula $$K_s = K_r(T_5 - T_4/Te - T_4)$$

* * * * *